March 19, 1957 W. H. WILLERT 2,785,438
PLASTICS EXTRUDER WITH MIXING HEAD
Filed Aug. 18, 1954 3 Sheets-Sheet 3

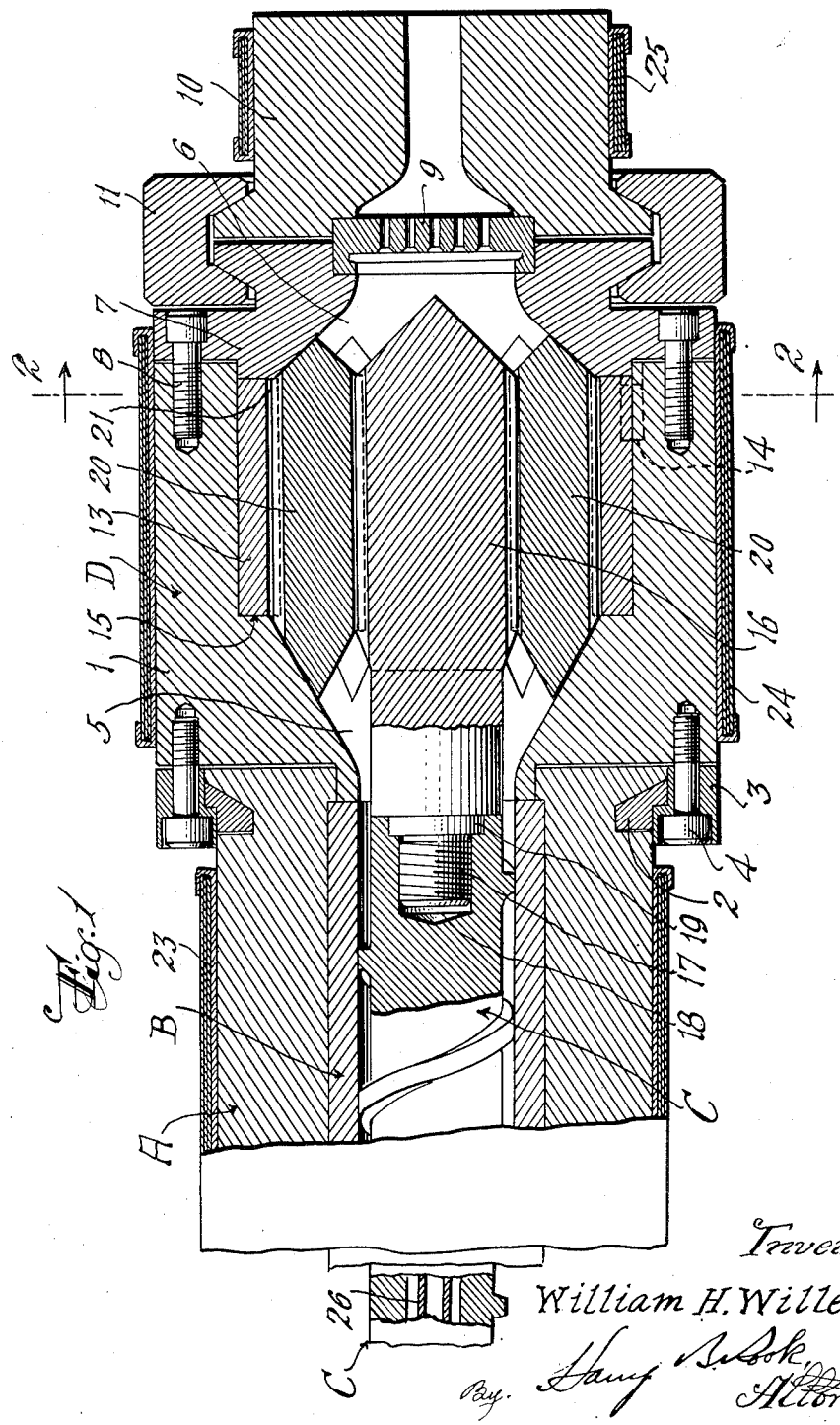

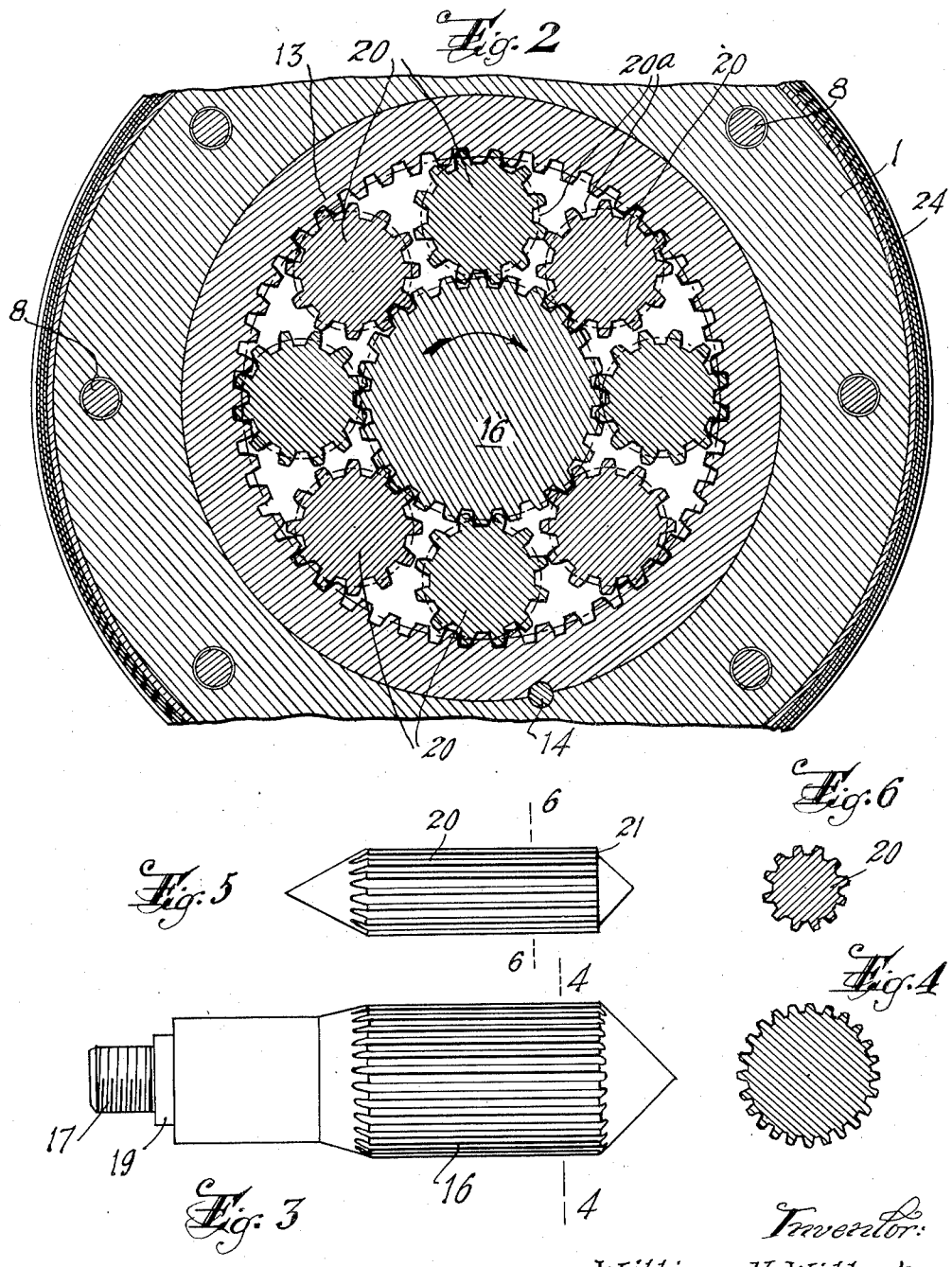

Inventor:
William H. Willert,
By
Attorney.

United States Patent Office 2,785,438
Patented Mar. 19, 1957

2,785,438

PLASTICS EXTRUDER WITH MIXING HEAD

William H. Willert, North Plainfield, N. J., assignor to Frank W. Egan & Company, Bound Brook, N. J., a corporation of New Jersey Application August 18, 1954, Serial No. 450,722

1 Claim. (Cl. 18—12)

This invention relates in general to machines for extruding plastic substances, and more particularly to a device for mixing, blending and homogenizing plastic substances in extrusion machines.

It is desirable, but frequently extremely difficult, to blend and homogenize two dissimilar substances, for example wax and polyethylene, and great difficulty has been encountered in accomplishing such blending, homogenizing and plasticizing in a continuous operation efficiently and economically.

Many efforts have been made to solve the problem, including the combination of the usual extrusion screw and a mixer but such combinations leave much to be desired in that uneconomical use of power is required to overcome back pressures, or the plastic material must be passed through the machine several times, or complicated control of the heating of the plastic compound is required or the rate of production of the homogenized plastic compound is too low.

Therefore, one object of the present invention is to provide in an extruding machine a combination of an extruding screw and a mixing head whereby a small quantity of a mixture of plastic substances at any given time can be blended, homogenized or plasticized at a temperature at which the mixture has a maximum resistance to flow, and yet is in a plastic or fluent state, and a batch of such a mixture can be fed to and passed through the mixing head in a continuous operation, so that large quantities of thoroughly blended or homogenized plastic compounds can be produced at a high rate and with relatively simple and compact apparatus and an economical consumption of power.

Another object is to provide in such a machine a novel and improved construction and combination of an extruding screw and a mixer which shall ensure a thorough and rapid mixing and plasticizing of plastic substances with a minimum of back pressure and with only one pass of the mixture through the mixer.

A further object is to provide in a machine of this character a mixer that shall comprise a novel and improved construction and combination of a plurality of toothed pinions or gears whereby a small quantity, for example one pound, of a plastic compound, at any given time, shall be subjected to several thousand individual or separate displacements or kneading cycles by the teeth of said pinions as said plastic compound is forced through the mixer by the extrusion screw, and the compound shall be continuously forced through and discharged from the mixer.

Other objects and advantages and results of the invention will be brought out by the following description in conjunction with the accompanying drawings in which Figure 1 is a longitudinal vertical sectional view through a part of the cylinder of a screw type extrusion machine and a mixer, constructed in accordance with the invention, portions of the cylinder and the screw being shown in elevation;

Figure 2 is an enlarged transverse vertical sectional view approximately on the plane of the line 2—2 of Figure 1;

Figure 3 is a detached side elevational view of the drive pinion of the mixer, drawn to the scale of Figure 1;

Figure 4 is a transverse vertical sectional view taken on the plane of the line 4—4 of Figure 3;

Figure 5 is a detached side elevational view of one of the mixing pinions, drawn to the scale of Figure 1;

Figure 6 is a transverse sectional view on the plane of the line 6—6 of Figure 5;

Figure 7:
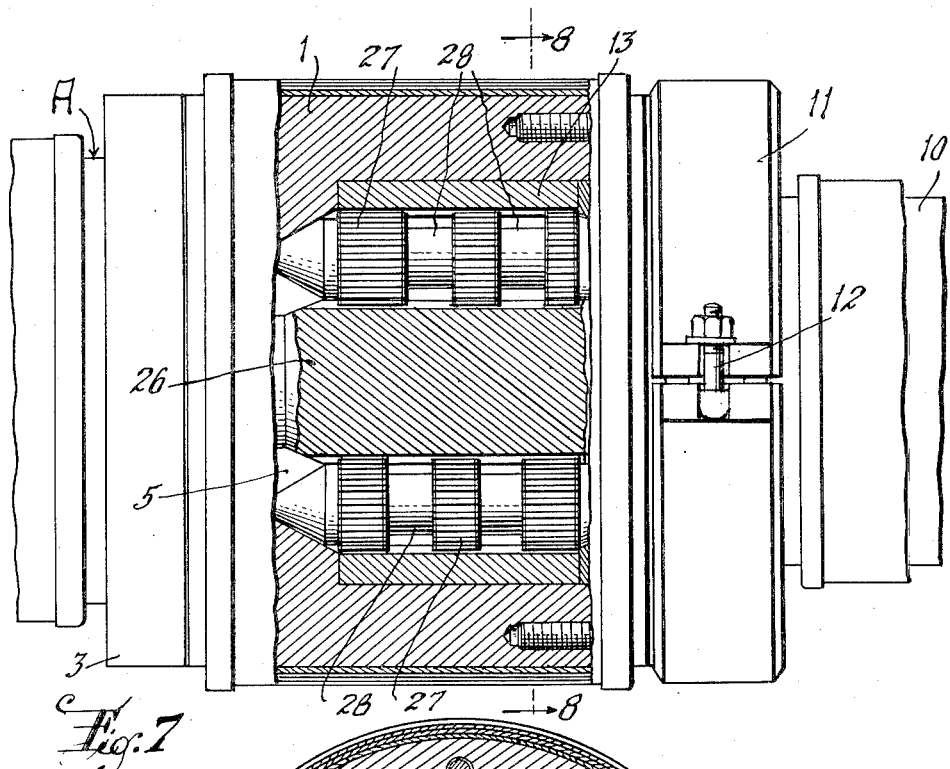
Figure 7 is a partial side elevational view and partial longitudinal vertical sectional view of a part of the cylinder of an extruding machine and a mixer, illustrating a modification of the invention.

Specifically describing the embodiment of the invention illustrated in Figures 1–5 inclusive, the reference character A designates a part of the cylinder of a known type of extrusion machine at the discharge end of the cylinder. Within the cylinder is the usual alloy liner B within which is rotatable the usual extrusion screw C which moves the plastic substance being operated upon from a hopper at the feed end of the cylinder A through the cylinder to the discharge end thereof and into the mixer generally designated D.

The mixer is shown as comprising a casing or barrel, that is secured to the discharge end of the cylinder A by a retaining ring 2 with which abuts a collar 3 which is secured by cap screws 4 to the mixer casing 1.

Within the mixing casing is a mixing chamber that has an inlet portion 5 and an outlet portion 6 which includes a ring 7 connected to the casing 1 by cap screws 8 and having a breaker plate 9 mounted coaxially therein and held in position by a die 10 which is in turn secured on the ring 7 by a split clamp ring 11 that is fastened by the usual swing bolts 12 (Figure 7).

An internal gear 13 is mounted within the mixing chamber, being held against rotation by lock pins 14 and having one end abutting a shoulder 15 and its other end abutted by the end ring 7. The inlet portion 5 of the mixing chamber is frusto-conical with its smaller end approximately of the same diameter as the liner B of the extrusion cylinder and with its larger end of approximately the same diameter as the circle in which lie the bases of the teeth of the internal gear 13. The outlet chamber 6 is also frusto-conical having its larger end of approximately the same diameter as the larger end of the inlet chamber and its smaller end leading to the breaker plate 9.

Extending coaxially from the discharge end of the screw C is a drive pinion 16 that has a screw extension 17 at one end fitted into a correspondingly threaded socket 18 in the end of the extruding screw. Preferably a cylindrical coaxial pilot portion 19 is provided between the pinion and the threaded extension 17 to ensure proper alignment of the pinion with the extruding screw. Meshing with and disposed between the drive pinion 16 and the internal gear 13 are a plurality of floating mixing pinions 20 that are free from each other as best shown in Figure 2. In the present instance there are eight pinions but the number may be varied as desired. The feed end of each pinion preferably is conical and in closely spaced relation to the frusto-conical surface of the inlet portion 5. The discharge end of each of the pinions is also frusto-conical and is spaced approximately .020" from the frusto-conical surface of the outlet portion 6 of the mixing chamber the larger end of which is of a diameter approximately equal to the pitch diameter of the internal gear each pinion having a shoulder 21 that abuts the inner surface of the end retainer ring 7 as indicated at 22 whereby the pinions are held against longitudinal movement with the plastic material that is forced through the mixing chamber by the extruding screw.

While the number of pinions 20 and the number and nature of the teeth in said pinions, the drive pinions 16 and the internal gear 13 may be varied, for the purpose of illustration, the internal gear has forty-eight teeth with a four-inch pitch diameter, the drive pinion 4 has twenty-four teeth with a two inch pitch diameter, and each of the pinions 20 has twelve teeth with a two-inch pitch diameter. In this particular design all of the teeth are of the twelve pitch, twenty degrees pressure angle, stub tooth type. By choosing the correct pitch diameters and the number of teeth in each part, so that they are all divisible by a number of common divisors, it is possible to use three, four, six or eight pinions at a given time, that are evenly spaced between the drive pinion and the internal gear.

The machine is designed to operate so that the differential in pressure of the plastic compound in the entrance portion 5 of the mixing chamber and the exit portion 6 of the mixing chamber should be only the equivalent of the amount of frictional drag of the plastic on the pinions. In other words, the pressure at the entrance portion 5 should be equal to the pressure at the exit portion 6 plus the friction force of the plastic on the teeth and on the surfaces of the pinions. As shown, the addendum of the teeth on the mixing pinions, which is the area between the pitch diameter and the outer diameter, is used to hold back the pinions against said frictional drag; in other words the height of the shoulders 21 is equal to the distance between the pitch line 20a of the teeth and the outer diameter of the pinions.

As usual, suitable heating and cooling apparatus may be utilized with the extruding cylinder, the mixer and the die. As shown, electric heater bands 23, 24 and 25 are applied to the extrusion cylinder, the mixer casing and the die, respectively, and the extruding screw is provided with a water-circulating channel 26 for cooling the screw. If desired, channels might be formed in the walls of the cylinders, the mixer and the die for circulating a heating or cooling fluid.

In the operation of the machine the extruding cylinder is first brought to the proper temperature by its heating apparatus and the raw material to be blended or homogenized is prepared by the conventional method and fed into the hopper of the extruding machine. When the temperature is satisfactory, for example around 350° to 420° F., the screw C is started and advances the plastic compound through the extrusion cylinder and into the mixing chamber. Under the pressure applied by the screw, the plastic compound is forced into all of the spaces in the mixer, including the spaces between the teeth of the pinions and the internal gear. As the drive pinion 16 rotates with the extruding screw in the direction indicated by the arrow in Figure 2, all of the pinions 20 are rotated in the opposite direction about their respective axes and with a cycloidal motion. The plastic compound between the teeth of the pinions 16 and 20 and the gear 13 is forced out of the spaces between the teeth as the teeth mesh with each other, and as the teeth disengage, the plastic compound is forced into the spaces so that a constant supply of the plastic compound is forced by the extrusion screw into the spaces between the pinions at one end thereof and at the same time the plastic composition is forced from the pinions through the breaker plate into the die. Consequently there is a constant or continuous displacement or movement of the plastic compound through the mixer and the pinion teeth squeeze and knead the plastic so as to thoroughly plasticize or homogenize the compound to a uniform consistency.

The mixer ensures a considerable amount of mechanical working of the plastic compound and the working of small quantities of the compound at any one time. For example, assuming that the extrusion screw rotates at sixty revolutions per minute and sixty pounds of the plastic compound is forced through the cylinder in one hour, which is within about ten percent of actual operation statistics, with all eight pinions in place and rotating with the screw, for one complete turn of the screw there are three hundred and eighty-four separate displacements of the plastic by the gear teeth. For sixty turns of the screw one pound of the plastic composition would receive in the neighborhood of twenty-four thousand individual kneading cycles. As shown, the pinion faces are approximately 2½" long, and it will be seen that by increasing the length of those faces, it is possible to produce a practically unlimited amount of kneading of a given mass of plastic composition.

Figure 8:
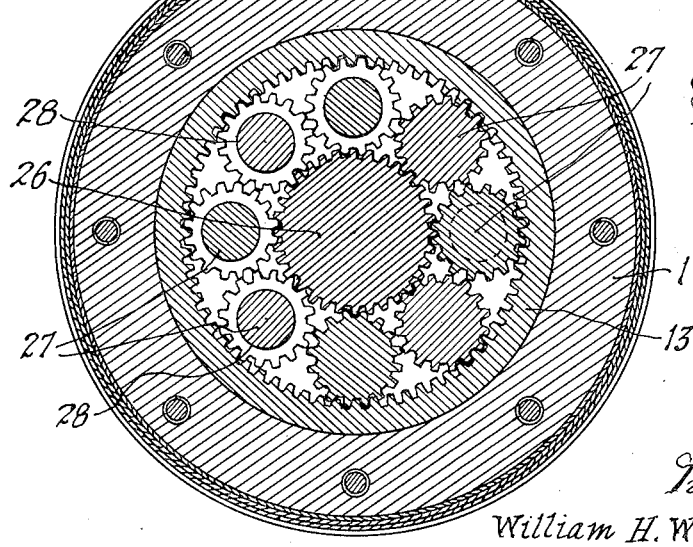
Figure 8 is a transverse vertical sectional view approximately on the plane of the line 8—8 of Figure 7.

A modification of the invention is shown in Figure 8 where the drive pinion 26 may be the same as the drive pinion 16, but the mixing pinions 27 have circumferential smooth walled grooves 28 spaced longitudinally thereof, the grooves in the different pinions being spaced differently longitudinally of the rollers as shown for example in Figures 7 and 8. With this construction, the plastic composition may be displaced laterally by the teeth of one of the pinions into the grooves of the next adjacent pinions so as to provide additional kneading of the plastic composition. The plastic will be forced through the mixing chamber and longitudinally of the pinions by the extruding screw in the same manner hereinabove described.

Other modifications and changes in the construction of the machine will occur to those skilled in the art as within the spirit and scope of the invention. For example, the size of the mixing chamber may be greatly increased to permit the use of more mixing pinions, and instead of the spur or stub type teeth on the pinions, helical, herringbone and other types of gear teeth could be used.

What I claim is:

The combination with a machine for extruding plastic compositions having a cylinder and a rotatable extrusion screw for moving a plastic substance therethrough, of a mixer including a casing fixedly mounted at the discharge end of said cylinder and having a chamber with a coaxial inlet and a coaxial outlet; a drive pinion in said casing rotatable by and coaxially with the screw and disposed at the discharge end of the screw, an internal gear in said chamber and coaxial with and encircling said drive pinion in spaced relation thereto, and a plurality of mixing pinions spaced circumferentially of said drive pinion and in mesh with said drive pinion and said internal gear, there being longitudinal elongated spaces extending through said chamber between said gear and said mixing pinions and between said mixing pinions and said drive pinion, the walls of said inlet leading from said cylinder directly to said longitudinal spaces at one end of said internal gear, and the walls of said outlet leading directly from said spaces at the other end of said internal gear, said longitudinal spaces providing the only passage for a plastic substance through said chamber from said inlet to said outlet, said chamber having a frusto-conical inlet portion whose smaller end is connected to said cylinder and is about equal in diameter to said cylinder and whose larger end is of a diameter slightly greater than the pitch diameter of said internal gear, and said chamber also having a frusto-conical outlet portion whose larger end is of a diameter approximately equal to the pitch diameter of said internal gear, said outlet portion of said chamber having an annular shoulder at said larger end and said mixing pinions having end shoulders abutting said annular shoulder of said chamber.

References Cited in the file of this patent

UNITED STATES PATENTS

| | | | |
|---|---|---|---|
| 1,595,470 | Johnson | Aug. 10, | 1926 |
| 1,750,088 | Bragard | Mar. 11, | 1930 |
| 2,055,956 | Wells | Sept. 29, | 1936 |
| 2,092,628 | Allen | Sept. 7, | 1937 |
| 2,371,227 | Dodge | Mar. 13, | 1945 |
| 2,399,008 | Doran | Apr. 23, | 1946 |
| 2,469,999 | Stober | May 10, | 1949 |
| 2,754,542 | Henning et al. | July 17, | 1956 |